US006959434B2

(12) United States Patent
Bera

(10) Patent No.: US 6,959,434 B2
(45) Date of Patent: Oct. 25, 2005

(54) METHOD OF DETERMINING THE SYNTACTIC CORRECTNESS OF EXPRESSIONS

(75) Inventor: Rajendra Kumar Bera, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 584 days.

(21) Appl. No.: 09/727,846

(22) Filed: Dec. 1, 2000

(65) Prior Publication Data

US 2001/0003210 A1 Jun. 7, 2001

(30) Foreign Application Priority Data

Dec. 1, 1999 (JP) ............................................. 11-342659

(51) Int. Cl.[7] .............................................. G06F 9/45
(52) U.S. Cl. ........................ 717/140; 717/141; 717/143
(58) Field of Search ................................ 717/140, 141, 717/143

(56) References Cited

U.S. PATENT DOCUMENTS

| 3,568,156 A | * | 3/1971 | Thompson ...................... 707/6 |
| 5,274,812 A | * | 12/1993 | Inoue ........................ 717/141 |
| 5,317,647 A | * | 5/1994 | Pagallo ........................ 382/161 |
| 5,528,524 A | * | 6/1996 | Oba et al. .................... 708/142 |
| 5,627,914 A | * | 5/1997 | Pagallo ........................ 382/189 |
| 6,018,735 A | * | 1/2000 | Hunter ........................... 707/5 |
| 6,237,139 B1 | * | 5/2001 | Hotta et al. ................. 717/131 |
| 6,311,323 B1 | * | 10/2001 | Shulman et al. ............ 717/111 |

FOREIGN PATENT DOCUMENTS

WO      WO 92/03782      *   3/1992   ................. 717/143

* cited by examiner

Primary Examiner—Tuan Dam
Assistant Examiner—Qamrun Nahar
(74) Attorney, Agent, or Firm—Schmeiser, Olsen & Watts; William H. Steinberg

(57) ABSTRACT

The present invention is a method (100) of determining the syntactic correctness of an expression for use in a computing environment. After creating (30) a string of characters from said expression, it looks for substrings (character sequences), which are legitimate and replaces (54) them with a shorter but semantically equivalent substring. It also looks for character sequences which are illegitimate, and replaces (54) them with a substring (i.e. "?") to indicate that it has met with an illegal sequence. It does these operations repeatedly, and in predetermined sequences, till no further changes in the string can be made; that is, the string achieves a constant length. An expression is determined to be syntactically correct only if said string reduces to a single predetermined character.

16 Claims, 2 Drawing Sheets

METHOD OF DETERMINING THE SYNTACTIC CORRECTNESS OF EXPRESSIONS

TECHNICAL FIELD OF THE INVENTION

The present invention relates to the determination of the syntactic correctness of expressions, such as those used in computer programs.

BACKGROUND ART

Algebraic expressions are typically used in computer programs to assign values to variables. These expressions normally occur on the right hand side of an assignment statement, and in particular after an assignment operator. The assignment operator most often used is an "=" sign. They are also used in parameter lists of functions, in conditional statements, etc., in computer programs. An example of an assignment statement is:

$$S=a+b*c+fn(a, b+c, d)+\text{func}(a, fn(c,d,e)) \quad (1)$$

wherein variable S is assigned a value, the value being dependent on a, b, c, d and e, each of which is either a number or a variable, and fn( ) and func( ), which are functions.

Prior methods of determining the syntactic correctness of expressions routinely break up the expression on the right hand side of the assignment operator into tokens and create a tree, where the tokens sit at the nodes of the tree. A number of rules of how to deal with those tokens, that have been created, are then applied.

DISCLOSURE OF THE INVENTION

It is an object of the present invention to provide an alternate and/or improved method of determination of the syntactic correctness of expressions.

According to a first aspect of the invention, there is provided a method of determining the syntactic correctness of an expression for use in a computing environment, said method comprising the steps of:

(a) creating a string of characters from said expression;

(b) iteratively substituting occurrences of said characters also occurring in a first predetermined list with characters from a second predetermined list; and (c) determining said expression to be syntactically correct only if said string reduces to a single predetermined character.

Preferably, characters not permitted in said string are substituted with a special character from said second predetermined list that causes said iteration to be ceased. Alternatively, these characters are substituted with a special character from said second predetermined list that causes said expression to be determined to be syntactically incorrect on completion of said iterative substitution step. Preferably, said expression is algebraic, and the creation step includes substituting each variable and variable operators with a single variable character, and retaining algebraic characters. In an alternative embodiment, said expression is a filename, and the creation step includes substituting subdirectory names, filenames and filename extensions with a single character, and retaining delimiter characters. In yet another embodiment, said expression is a variable or function name, and the creation step includes substituting a number with one character, and substituting an alphabet or an underscore with a second character.

According to another aspect of the invention there is provided a computer readable memory medium having recorded thereon a computer program for implementing the method described above.

The present invention deals with the entire expression in its operations. It essentially mimics the way humans visually interpret and check an expression's syntax. Thus the invention looks for substrings (character sequences), which are legitimate and replaces them with a shorter but semantically equivalent substring. It also looks for character sequences which are illegitimate, and replaces them with a substring (i.e. "?") to indicate that it has met with an illegal sequence. It does these operations repeatedly, and in predetermined sequences, till no further changes in the string can be made; that is, the string achieves a constant length.

Since the invention does not rely upon operator and operand tokens, but on character combinations appearing in a character string, it is not limited to determining the syntactic correctness of algebraic expressions alone but can also be used to determine the syntactic correctness of other types of character strings. These may include filenames and variable names, provided the syntax rules of their formation are known. Such rules must also be consistent and unambiguous.

BRIEF DESCRIPTION OF THE DRAWINGS

A number of preferred embodiments of the present invention will now be described with reference to FIG. 1, in which is a flow diagram of a method of determining whether an algebraic expression is syntactically correct.

DETAILED DESCRIPTION INCLUDING BEST MODE

Figure 1:
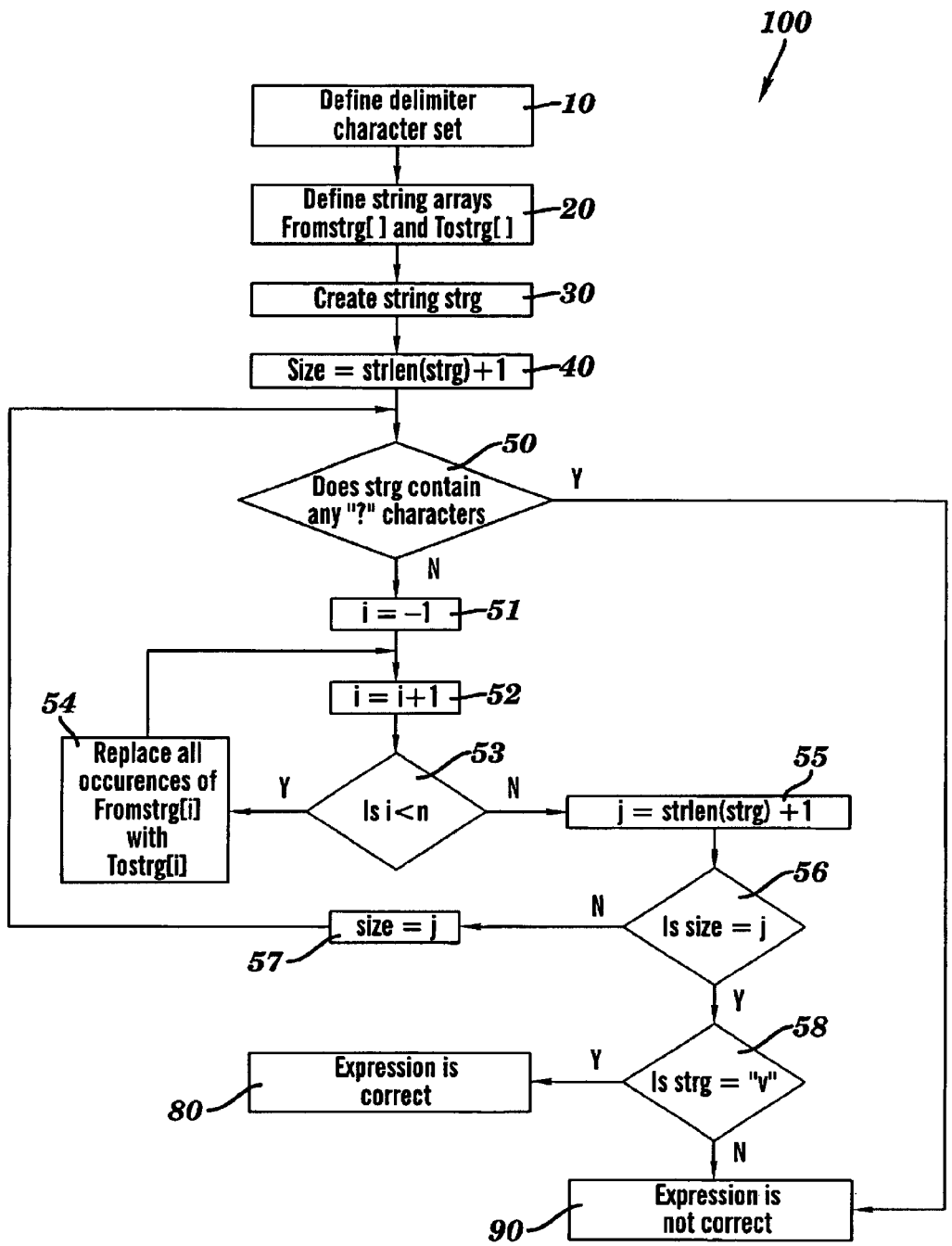

Referring to FIG. 1, a flow diagram is shown of a method 100 of determining whether an algebraic expression is syntactically correct. Starting at step 10, a set of characters is defined called a delimiter character set. The delimiter character set is a designated set of special characters, which act as markers within a character string strg, created from the algebraic expression. Character(s) of the character string strg appearing between such markers, or between the beginning of the character string strg and a marker, or between a marker and the end of the character string strg is/are treated as a single entity. If the delimiter set is empty, then each of the characters in the algebraic expression is treated as an entity.

Entities belong to a certain predefined set of types. In the algebraic expression they are generically called a variable "v". In a filename they are called a filename component "f", whereas in a variable name they are called an alphabet "a" component if the entity is an alphabet or an underscore, and a number "n" if it is a number. If the entity cannot be matched to a predefined type, it is typed "?".

The delimiter character set is compactly expressed as a string, where each character within the quotation marks is a delimiter character. An example of a delimiter character set for an algebraic expression is "+−*/,( )".

Step 20 defines a FromStrg[ ] and a ToStrg[ ] string array. There is a one-to-one correspondence between the elements of the two arrays, FromStrg[ ] and ToStrg[ ] such that the i-th element in the FromStrg[ ] array, corresponds to the i-th element in the ToStrg[ ] array. The number of elements in the FromStrg[ ] array are therefore equal to the number of elements in the ToStrg[ ] array. The NULL string at the end of each array FromStrg[ ] and ToStrg[ ],is used to indicate the end of the array.

The FromStrg[ ] string array contains a list of character combinations which comprehensively describe the combinations which can be detected to be either correct or incorrect. The ToStrg[ ] string array contains a corresponding list of character combinations, such that if character string strg contains the i-th element from the FromStrg[ ] string array, it can be replaced by the corresponding i-th element from the ToStrg[ ] string array. The task of such replacements is to progressively simplify the string strg and bring it to the type it is supposed to represent. An element in the ToStrg[ ] string array will always have a lesser number of characters than its corresponding element in the FromStrg[ ] string array, since the element in the ToStrg[ ] string array is expected to represent a simplified version of the corresponding element in the FromStrg[ ]. An illegal element in the FromStrg[ ] string array will have a "?" element as its corresponding element in the ToStrg[ ] string array. A legal element in the FromStrg[ ] string array will have a more cryptic but semantically correct combination of delimiter and/or type characters.

Often a one-step replacement between an element in the FromStrg[ ] string array, consisting of delimiter and type characters, to a legitimate element in the ToStrg[ ] string array, also consisting of delimiter and type characters, may not be possible (or obvious). In such cases multiple step replacements are used. One or more combinations participating in such multistep replacements will carry additional characters, such as an "#" character. Such characters play the role of temporary intermediaries and may be called intermediate characters.

With respect to the delimiter character set defined for an algebraic expression, the two string arrays are defined as (in the notations of C programming language):

$$\text{FromStrg}[] = \{``)(", ``(v)()", ``(v)(v)", ``v(v)", ``v(\#)", ``v()", \\ ``(v)", ``vv", ``v[v]", ``(v,v)", ``(+v)", ``(-v)", \\ ``v*v", ``v/v", ``v+v", ``v-v", ``,v,", ``"\};$$

$$\text{ToStrg}[] = \{``?", ``?", ``?", ``v", ``v", ``v", \\ ``v", ``?", ``v", ``(\#)", ``(v)", ``(v)", \\ ``v", ``v", ``v", ``v", ``,", ``"\};$$

Figure 2:
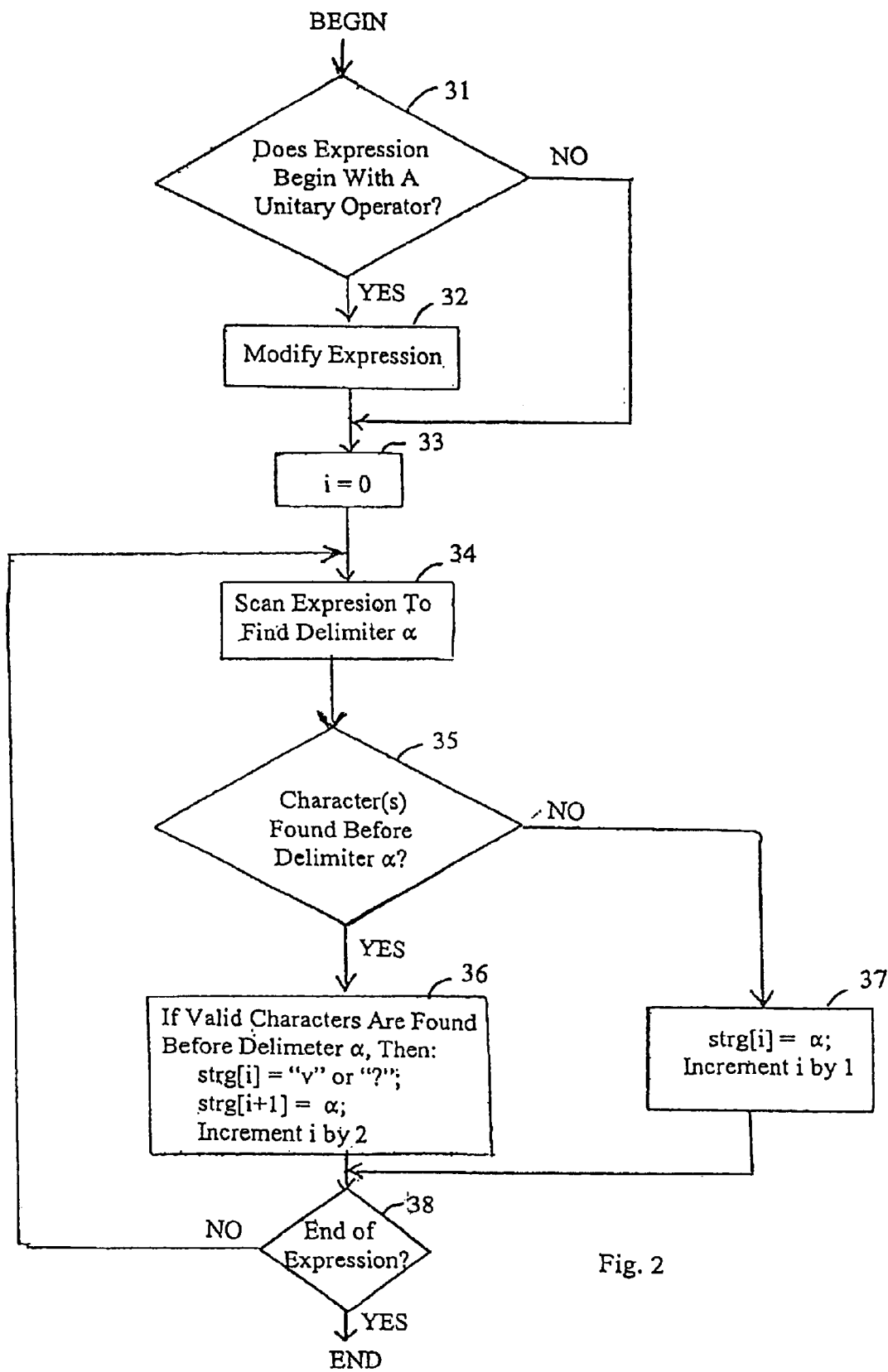
FIG. 2 is a flow diagram describing a step of FIG. 1 in which a character string is created from an algebraic expression being analyzed.

In step 30, the character string strg is created from the algebraic expression being analysed. Thus for a given character string, the derived character string strg obtained by step 30 will be a sequence of delimiter characters and type characters. Step 30 is performed by steps 31–38 in the flow diagram of FIG. 2.:

In step 31, it is determined whether the given algebraic expression begins with a unitary + or − operator. If this is so, then the expression is modified in step 32 by beging prefixed with the numeral 0. Alternatively, the algebraic expression may be enclosed in brackets in step 32. Furthermore, all blank (or space) characters are removed from the algebraic expression in step 32. A counter variable i is initiated to 0 in step 33.

In step 34, the expression is scanned from left to right, character by character, until a delimiter character is found or the end of the expression is reached. A variable delimiter character α is set equal to the delimiter character found.

(a) If in step 35 no characters are found before the delimiter character α, then in step 37 the i-th character in the character sting strg is set equal to the delimiter character as follows: strg[i]=α. Also in step 37, the counter variable i is incremented by 1 and the procedure continues to step 38.

(b) If in step 35 one or more characters are found before the delimiter then it is determined in step 36 whether it/they form(s) a valid variable name, function name or number. If the character(s) is/are valid, then a character "v" is put into string position strg[i]. Alternatively a character "?" is put into string position strg[i]. The following string position in the string strg[ ] is filled with the delimiter character α as follows: strg[i+1]=α. The counter variable i is increased by 2 and the procedure continues to step 38.

Step 38 determines whether the end of the expression has been reached. If this is so, then the procedure ends. If this is not so, then the procedure continues to step 34, assuming that the expression now begins at the character immediately following the delimiter character a.

As an example, the algabraic expression obtained from the assignment statement (1) is as follows:

$$a+b*c+fn(a, b+c, d)+func(a, fn(c,d,e)) \tag{2}$$

and the following string strg[ ] will be produced by following substeps 31 to 33:

$$v+v*v+v(v,v+v,v)+v(v,v(v,v,v)) \tag{3}$$

Step 40 initialises a variable size as the length of the string strg, including an end of string character.

The method 100 continues to step 50 where it is determined whether the constructed string strg[ ] contains one or more "?" characters. If the string strg[ ] contains at least one "?" character, then the algebraic expression is syntactically incorrect, and the method 100 ends in step 90 by returning that the expression is not correct. Alternatively, the method 100 continues to step 51. Step 51 sets the counter variable i equal to −1, while step 52 increments the counter variable i by 1.

Step 53 determines whether the counter variable i is still smaller than n, where n is the dimension of the FromStrg[ ] and ToStrg[ ] arrays. If this is affirmative, then step 54 replaces each occurrence of the string FromStrg[i] in string strg with ToStrg[i]. Steps 52 to 54 are repeated until step 53 determines that the end of the FromStrg[i] array has been reached.

The method 100 then continues to steps 55 and 56 where it is determined whether the resulting string strg is the same size as before steps 51 to 54, by comparing it with the variable size. If the length of the string strg has changed, then the method 100 returns to step 50 after the variable size has been set to the new length of the string strg.

If the length of the string strg has not changed, it means that the string strg has been reduced as far as possible and the method 100 continues to step 58 where it is determined whether the string strg equals the character "v". Only if strg="v" is the algebraic expression syntactically correct and the method 100 ends in step 80. (The significance of this is that any expression must eventually be reducible to a number or a variable.) Alternatively the algebraic expression is syntactically incorrect, and the method 100 ends in step 90 by returning that the expression is not correct.

As an illustration of steps 40 onwards described above, consider the further processing of the example string Strg of equation 3, the method 100 commencing from step 40 where it is determined that the variable size equals 31, and after a first iteration repeating steps 52 to 54, the string strg is reduced to:

$$v(v,v)+v(v,v(v,v)) \tag{4}$$

Because the variable j, determined in step 55 is equal to 19, which step 56 determines not to be equal to the variable size, the variable size is therefore set to 19 in step 57 and the method 100 proceeds to step 50. The iteration in steps 52 to 54 is repeated and the string strg is reduced to:

$$v(\#)+v(v,v(\#)) \quad (5)$$

Again steps 55 and 56 determine that the string strg has reduced and another iteration of steps 52 to 54 further reduces the string strg to:

$$v(\#) \quad (6)$$

Yet a further iteration of steps 52 to 54 reduces the string strg to:

$$v \quad (7)$$

Steps 55 and 56 again determine that the string strg has reduced and the method 100 proceeds to step 50 after the variable size has been set to 2 in step 57. However, the iteration of steps 52 to 54 does not further reduce the string strg and step 56 therefore directs the method 100 to step 58. Step 58 determines that the string strg is equal to the string "v", and the expression of equation 2 is therefore determined to be syntactically correct.

Examples of algebraic expressions that are not syntactically correct are:

a*+b: there are two operators between variables a and b;
*a*b: an expression can not start with a multiplication operator;
a(b+c): there is no operator between the variable a and the operator (;
a*(b+c)): the last ) operator does not have a matching (operator.

Source or psuedo-code for performing steps 50 to 90 of the method 100 is as follows:

```
// strg[ ] is the character array derived from the given
    expression // using steps 31–38 described above.
// size is the size of the string strg.
// n is the dimension of FromStrg[ ] and ToStrg[ ] arrays.
// ChangeSubstrg( ) replaces FromStrg[i], if found in strg
    with ToStrg[i].
// cond is a boolean flag which saves the result of the
    iteration.
// It is TRUE if the strg is syntactically correct, else FALSE.
size=strlen(strg)+1;
cond=TRUE;
while (cond) {
   if(strchr(strg,(int)'?')break;
   i=−1
   while (++i<n) {
      while (strstr(strg, FromStrg[i]))
      ChangeSubstrg(strg, FromStrg[i], ToStrg[i]);
   }
   j=strlen(strg)+1;
   if (size==j) break;
   size=j;
}
if (strcmp(strg, "v") !=0) cond=FALSE;
if (cond) Msg("Expression is correct");
else Msg("Expression is incorrect");
```

The method 100 may be viewed as adding to the list of isxxx( ) functions typically found in modern compiler libraries, such as (in C), isalpha( ), isdigit( ), etc. The present method 100 may be encoded into an isexpression( ) function.

In an alternative embodiment, the method 100 is used to determine the syntactic correctness of a filename. For example, suppose a filename can have one of the following three syntaxes:

(i) <drive name>:/<dir name>/<subdir name>/ . . . /<subdir name>/<filename>/.<ext>
(ii) <filename>.<ext>
(iii) <filename>

Following the method 100, and in particular step 10, a delimiter character set is defined as "./". Step 20 defines the following string arrays:

$$FromStrg[\ ]=\{\text{"f.f.f"}, \text{"f.f/"}, \text{"f.f"}, \text{"/f/"}, \text{"f:"}, \text{"/\#"}, \text{"\#/f"}, \text{""}\}$$

and $$ToStrg[\ ]=\{\text{"?"}, \text{"?"}, \text{"f"}, \text{"/"}, \text{"\#"}, \text{"?"}, \text{"f"}, \text{""}\}$$

Here f represents a (sub)directory name, filename or a filename extension. Hence if filename is syntactically correct, it will initially produce the string "f:/f/f/ . . . /f/f.f", "f.f" or "f" respectively, for the syntaxes (i), (ii), (iii) noted above.

Only if the filename is syntactically correct, then a string "f" will result from the method 100. Step 58 determines whether the string strg has been reduced to the character "f".

This embodiment may be coded as an IsFilename( ) function, which takes a character string, presumed to be a filename, as its input.

In yet another embodiment, the method 100 is used to determine whether an expression forms a valid variable or function name. It is assumed that this expression must start with an alphabetical character or an underscore, followed by a sequence of characters, each of which can be an alphanumeric character or an underscore.

In step 30, scanning the expression string from left to right character by character, if the character is a number, it is replaced with the character "n". Similarly, if the character is an alphabetical character or an underscore, it is replaced with the character "a". If the character is anything else, then it is replaced with the character "?".

In this embodiment, the delimiter character set defined is empty, while the following two string arrays are defined in step 20:

$$FromStrg[\ ]=\{\text{"aa"}, \text{"an"}, \text{""}\}$$

and $$ToStrg[\ ]=\{\text{"a"}, \text{"a"}, \text{""}\}$$

Only if the string expression is a variable name will step 58 determine that the string strg has reduced to the character "a" and proceed to step 80 for correct expressions.

This embodiment can be coded as an IsVar( ) function, which takes the character string, presumed to be a variable, as its input.

Embodiments of the invention can be implemented within compilers, for example. As is well known, a compiler generates machine executable object code from high-level source code, written in languages such as C++ and Java™.

The foregoing describes only some embodiments of the present invention, and modifications and/or changes can be made thereto without departing from the scope and spirit of the invention, the embodiments being illustrative and not restrictive.

I claim:

1. A method of determining the syntactic correctness of an expression for use in a computing environment, said method comprising the steps of:

(a) creating a string of characters from said expression;

(b) iteratively substituting occurrences of said characters also occurring in a first predetermined list with characters from a second predetermined list; and (c) determining said expression to be syntactically correct only if said string reduces to a single predetermined character.

2. The method according to claim 1, whereby characters not permitted in said string are substituted with a special character from said second predetermined list that causes said iteration to be ceased.

3. The method according to claim 1, whereby characters not permitted in said string are substituted with a special character from said second predetermined list that causes said expression to be determined to be syntactically incorrect on completion of said iterative substitution step (b).

4. The method according to claim 1, whereby said expression is algebraic, and step (a) includes substituting each variable and variable operators with a single variable character, and retaining algebraic characters.

5. The method according to claim 1, whereby said expression is a filename, and step (a) includes substituting subdirectory names, filenames and filename extensions with a single character, and retaining delimiter characters.

6. The method according to claim 1, whereby said expression is a variable or function name, and step (a) includes substituting a number with one character, and substituting an alphabet or an underscore with a second character.

7. The method according to claim 1 comprising the further step, before step (a), of:

(d) defining said first predetermined list and said second predetermined list as arrays having one-to-one correspondence.

8. The method according to claim 7, whereby, step (d) includes the steps of:

(e) defining said first predetermined list such that its elements correspond to all possible correct and incorrect combinations of characters; and (f) defining said second predetermined list such that it has one single character in the corresponding location for all correct combinations in said first array, and another single character in the corresponding location for all incorrect combinations in said first array.

9. A computer readable memory medium for storing a program for apparatus which determines the syntactic correctness of an expression for use in a computing environment, said program comprising:

code for a creation step for creating a string of characters from said expression;

code for a substitution step for iteratively substituting occurrences of said characters also occurring in a first predetermined list with characters from a second predetermined list; and code for a determination step for determining said expression to be syntactically correct only if said string reduces to a single predetermined character.

10. The computer readable memory medium according to claim 9, whereby characters not permitted in said string are substituted with a special character from said second predetermined list that causes said iteration to be ceased.

11. The computer readable memory medium according to claim 9, whereby characters not permitted in said string are substituted with a special character from said second predetermined list that causes said expression to be determined to be syntactically incorrect on completion of said iterative substitution step.

12. The computer readable memory medium according to claim 9, whereby said expression is algebraic, and said creation step includes substituting each variable and variable operators with a single variable character, and retaining algebraic characters.

13. The computer readable memory medium according to claim 9, whereby said expression is a filename, and said creation step includes substituting subdirectory names, filenames and filename extensions with a single character, and retaining delimiter characters.

14. The computer readable memory medium according to claim 9, whereby said expression is a variable or function name, and creation step includes substituting a number with one character, and substituting an alphabet or an underscore with a second character.

15. The computer readable memory medium according to claim 9 further comprising:

code for a definition step for defining said first predetermined list and said second predetermined list as arrays having one-to-one correspondence.

16. The computer readable memory medium according to claim 15, wherein said code for said definition step comprises:

code for a first definition step for said first predetermined list such that its elements correspond to all possible correct and incorrect combinations of characters; and code for a second definition step for defining said second predetermined list such that it has one single character in the corresponding location for all correct combinations in said first array, and another single character in the corresponding location for all incorrect combinations in said first array.

* * * * *